Aug. 10, 1965 JIN-ICHI NAGUMO ETAL 3,200,265

PULSE GENERATOR

Filed May 22, 1962 6 Sheets-Sheet 1

INVENTORS
J. Nagumo
S. Yamada
K. Yamanaka

BY Watson, Cole, Grindle & Watson
ATTORNEYS

INVENTORS
J. Nagumo
S. Yamada
K. Yamanaka
BY Watson, Cole, Grindle & Watson
ATTORNEYS Aug. 10, 1965 JIN-ICHI NAGUMO ETAL 3,200,265

PULSE GENERATOR

Filed May 22, 1962

6 Sheets-Sheet 3

INVENTORS
J. Nagumo
S. Yamada
K. Yamanaka
BY Watson, Cole, Grindle & Watson
ATTORNEYS INVENTORS
J. Nagumo
S. Yamada
K. Yamanaka
BY Watson, Cole, Grindle & Watson
ATTORNEYS

INVENTORS

J. Nagumo

S. Yamada

K. Yamanaka

BY Watson, Cole, Grindle & Watson

ATTORNEYS

Aug. 10, 1965 JIN-ICHI NAGUMO ETAL 3,200,265

PULSE GENERATOR

Filed May 22, 1962 6 Sheets-Sheet 6

INVENTORS
J. Nagumo
S. Yamada
K. Yamanaka
BY Watson, Cole, Grindle & Watson
ATTORNEYS United States Patent Office 3,200,265
Patented Aug. 10, 1965

3,200,265

PULSE GENERATOR

Jin-Ichi Nagumo, Minatoku, Tokyo, Shigeharu Yamada, Kokubunji-machi, Tokyo, and Kaoru Yamanaka, Fuchu, Tokyo, Japan, assignors to Nippon Telegraph and Telephone Public Corporation, Chiyoda-ku, Tokyo, Japan, a corporation of Japan Filed May 22, 1962, Ser. No. 196,233
Claims priority, application Japan, June 27, 1961, 36/22,411
3 Claims. (Cl. 307—88.5)

This invention relates to a pulse generator utilizing a time quantization circuit wherein such a nonlinear negative resistance element having N type negative resistance characteristics such as Esaki diode and a short circuited cable having a terminated resistance applied to the input side are connected to a source through an electric current source impedance including a direct current load resistance.

An object of the present invention is to provide a circuit operating at a high speed to convert a pulse width to a number of pulses with a very simple circuit formation. Specific embodiments of the invention will now be described by way of example with reference to the accompanying drawings in which:

FIGURE 1 in the accompanying drawings, is a diagram showing an example of the circuit formation of a pulse generator which is the base of the present invention.

Figure 6A:
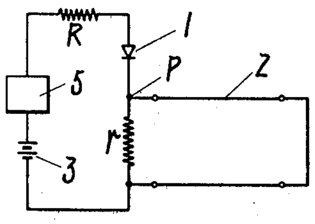

FIGURES 6A and B are diagrams indicating alternative methods of applying trigger signals.

Figure 7:
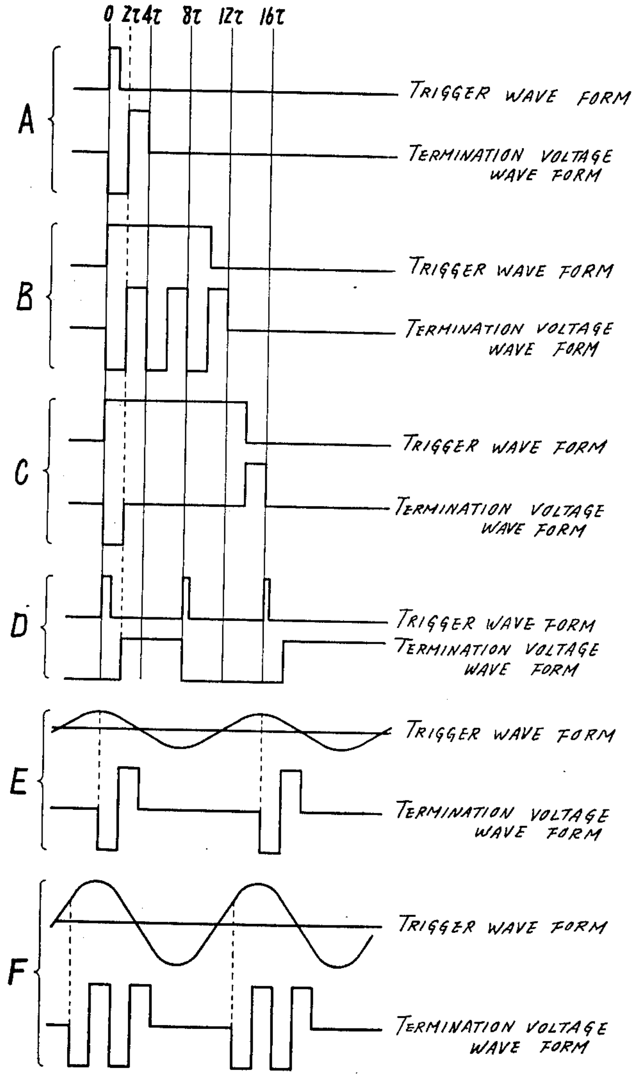

FIGURE 7 is an explanatory view of the operating wave form of an apparatus of the present invention.

Figures 8A, 8B:
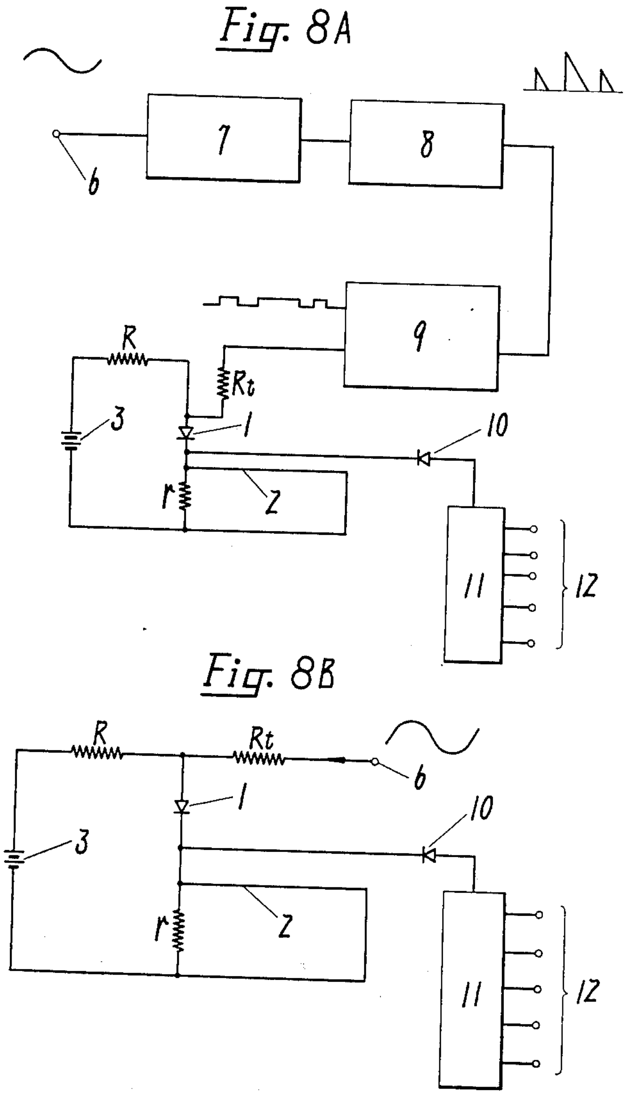

FIGURES 8A and 8B are diagrams of analog-to-digital converters.

Figure 9:
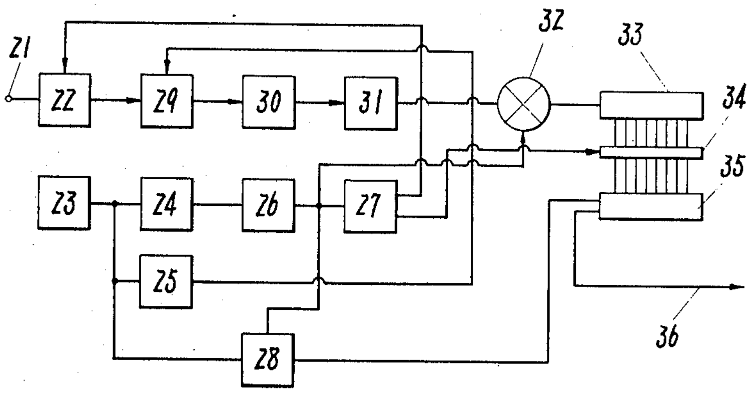

FIGURE 9 is a pulse code modulation circuit embodying the present invention.

Figure 10:
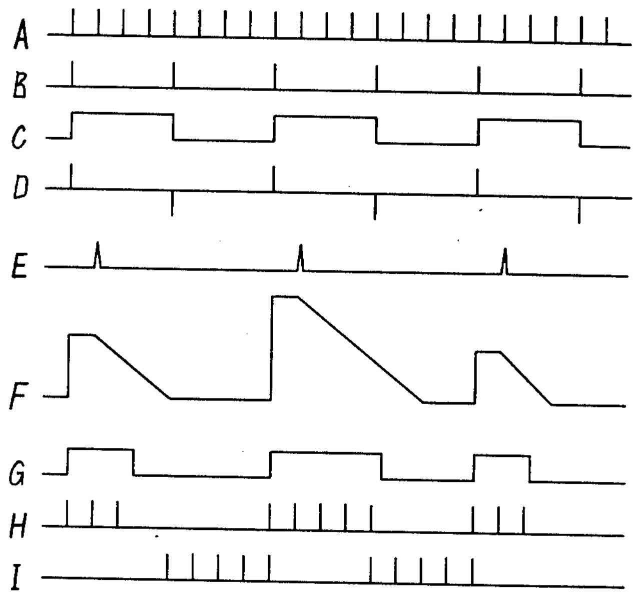

FIGURE 10 is a wave form diagram showing a process in which a binary code output is obtained in the circuit shown in FIGURE 9.

Figure 11:
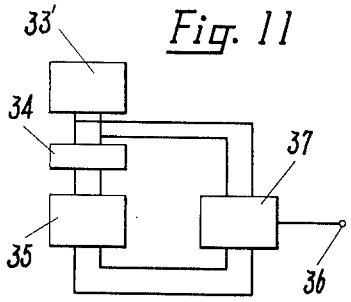

FIGURE 11 shows a modification of the counter used in FIGURE 9.

Figure 12:
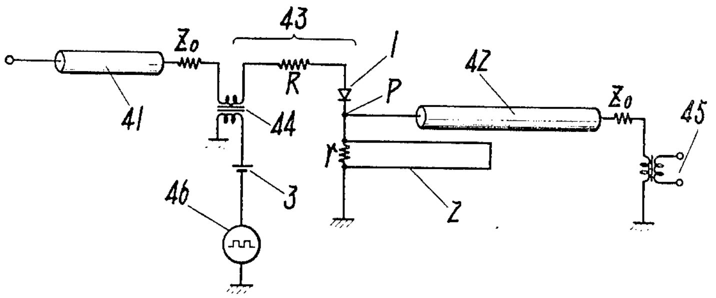

FIGURE 12 is an embodying of a pulse regenerating repeater embodying the present invention.

Figure 13:
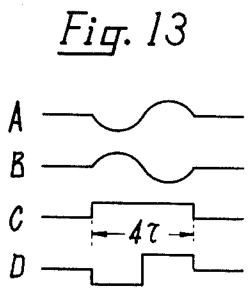

FIGURE 13 is a wave form diagram for explaining the operation of the circuit of FIGURE 12.

First of all, the time quantization circuit shall be explained.

Figure 1:
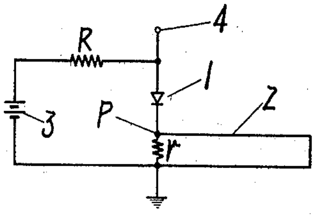
Figure 2:
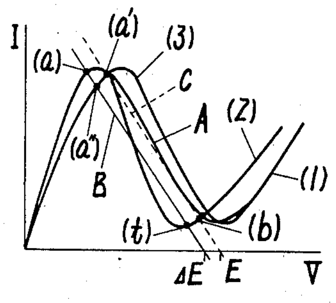
FIGURE 2 is a voltage-current characteristic diagram for explaining the operating principle of the pulse generator.

FIGURE 1 is a diagram of an embodiment showing the formation of a time quantization circuit used in the present invention. 1 is a nonlinear negative resistance element. 2 is a short-circuited delay cable. 3 is an electric current source. 4 is a trigger pulse input terminal. R is a direct current load resistance. $r$ is a termination resistance. Now, if the voltage-current characteristics of the negative resistance element are such as are shown by A in FIGURE 2 and the load straight line of the circuit shown in FIGURE 1 is set to be B in FIGURE 2, it will be normally stable at the point *a*.

When a trigger signal is given to the terminal 4 and its operating point passes the peak current value and comes to the negative resistance, the load line will move as shown by the dotted line C, the characteristic curve will at the same time move to 2 and therefore the circuit state will be stable at the point *b*.

In such case, due to the current variation at both stable points *a* and *b*, the electric potential of the point P in FIGURE 1 will fall.

This falling potential or negative variation will be transmitted to the short circuited delay cable 2. If the delay time of the cable 2 is $\tau$, the potential of the point P will be kept constant until the reciprocating time $2\tau$. But, after $2\tau$, the reflected voltage will be given with a reverse or positive polarity, therefore the potential of the point P will rise and the characteristics curve 2 will approach 1. When its intersection with the straight line C passes the valley, it will again enter the range of the negative resistance, the electric current will increase and the potential of the point P will become positive. When the point P becomes positive, the characteristics curve will move to 3. If a trigger exists, the intersection $a'$ of the curve 3 with the straight line C will be a stable point and the voltage at both ends of the negative resistance element 1 will decrease.

Here, again, $t=4\tau$ and, until the reflected voltage returns, the potential of the point P will be kept constant. But, when the reflected voltage returns, the potential will fall toward zero and therefore the operating point will return to *a* from $a'$. However, if no trigger current exists at the terminal 4, the operating point will not pass the peak point in FIGURE 2 but will be stable at the point *a*. If a trigger current exists, the operating point will again pass the peak point and the above described operation will be repeated.

Figure 3:
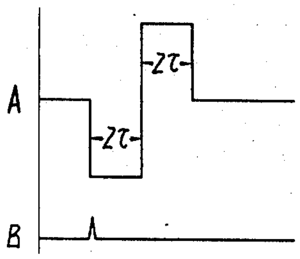
FIGURE 3 is a diagram showing a trigger pulse and an output wave form obtained by the circuit shown in FIGURE 1.

FIGURE 3 shows the relationship between the trigger signal and the potential P. A shows the potential variation. B shows the trigger signal. In case that a trigger signal is wide, over $4\tau$, the above mentioned variation will be repeated after every $4\tau$ and the number of output pulses corresponding to the pulse width will be obtained.

Figure 4:
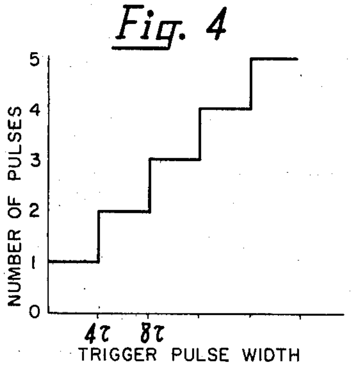
FIGURE 4 is a diagram showing the relationship between the time width of an input trigger and the obtained number of pulses.

FIGURE 4 shows such relationship. The abscissa represents the input trigger pulse width and the ordinate represents the number of pulses.

The above described time quantization circuit has an advantage that the peak current point of the negative resistance element, for example, an Esaki diode is so stable and steep that the quantizing operation will be stable and the boundary of the transition will be strict.

Figure 5A:
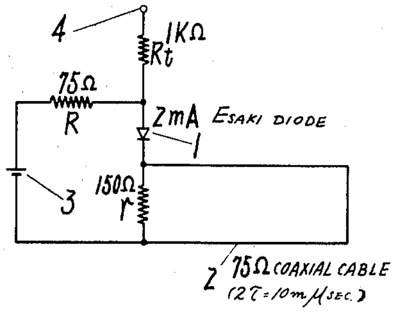
FIGURE 5A shows a circuit similar to that shown in FIGURE 1 and indicating exemplary values of the components.
Figure 5B:
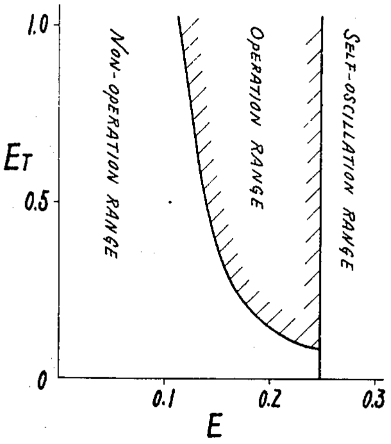
FIGURE 5B is an explanatory diagram indicating the operating range of the circuit.

FIGURE 5A shows a practical circuit. FIGURE 5B is an explanatory diagram of the operating range of the circuit. In FIGURE 5A R*t* is a resistance for feeding a trigger voltage. In FIGURE 5B the voltage of the trigger pulse is taken on the ordinate, and the direct current bias voltage for the Esaki diode 1 is taken on the abscissa. It is shown by the combination of both that there are three operating ranges.

Figure 6B:
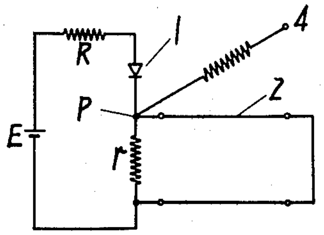

FIGURES 6A and 6B show alternative methods of applying trigger signals. FIGURE 6A shows a pulse generator 5 connected in series with a direct current source for biasing. FIGURE 6B shows a trigger signal arranged to be applied in the form of an electric current from a terminal 4.

FIGURE 7 is an explanatory diagram of the operating waveform of the apparatus of the present invention.

Each waveform set A to F in FIGURE 7 shows the relationship between the waveform (above) of the trigger signal and the waveform (below) of the termination voltage at the point P.

Waveform set A shows the case where the pulse width of the trigger signal is smaller than 2.

Waveform set B shows the waveform of the quantizing operation in the case where the pulse width of the trigger signal is long.

Each of waveform sets C and D shows the waveform of the quantizing operation in the case where a sinusoidal waveform is used for the trigger signal.

The above-described quantizing operations can be utilized as they are for the pulse generator.

An analog-to-digital converter in which the pulse generator of the present invention is used will now be explained.

FIGURES 8A and 8B are block diagrams showing the circuits. 6 is an analog signal input terminal. 7 is a sampling circuit. 8 is a sawtooth wave converting circuit. 9 is a slicer circuit. 10 is a diode. 11 is a binary counter. 12 is a binary code output terminal. FIGURE 8A shows the case where the input signal is converted to a rectangular wave trigger prior to coding. FIGURE 8B shows the case where the signal is directly coded.

FIGURE 9 is a block diagram showing an embodiment of a pulse code modulation circuit in which the pulse generator of the present invention is used. 21 is an input terminal for signals to be coded. 22 is a sampling register circuit. 23 is a clock pulse generating circuit. 24 is a frequency dividing circuit generating one pulse each time *n* clock pulses arrive. 25 is a timing pulse generating circuit. 26 is a bistable circuit. 27 is a differentiating circuit. 28 is an "and" circuit. 29 is a charging and discharging circuit. 30 is a slicer. 31 is a pulse generating circuit of the type shown in FIGURE 1. 32 is a gate circuit. 33 is a binary counting circuit. 34 is a transmission gate. 35 is a shift register. 36 is an output line.

The signal applied to the input terminal 21 will be sampled and registered in the sampling register circuit 22. That is to say, when a pulse train is generated from the clock pulse generating circuit 23 as shown at waveform A in FIGURE 10 is converted as in waveform B in FIGURE 10 is being passed through the frequency dividing circuit 24 and is applied to the bistable circuit 26, a signal such as that shown in waveform C in FIGURE 10 will be obtained. When it is differentiated in the differentiating circuit 27, a signal such as that shown at waveform D in FIGURE 10 will be obtained. The positive part, for example, of this signal is applied to the sampling register circuit 22 as a sampling pulse.

Though the case of quantization by the PCM system by the binary counter is shown in the above, quantization by the delta modulation system wherein the quantization period is selected to be much smaller than $1/2W$ (wherein W is a band width of the signal) so that the variation of the signal per sample may not exceed 1 quantum ($4\tau$).

That is to say, the binary counter 33′ as shown in FIGURE 11 is used instead of the counter 33 of *n* bits used in the above described PCM modulation, the pulse corresponding to each sample is used to the counter 33′ and is shifted to the register 35 before the next sample is used to the counter and the contents shifted to the register 35 are compared with the contents of the counter 33′ by the next sample in the comparison circuit 37 so that the signal difference may be coded through a logical comparison circuit having such function as will give a negative pulse if the first sample is larger, will give a positive pulse if it is smaller and will give no pulse if both are equal.

This is the delta modulation by comparison of numerical values. This system is based on the comparison and eliminates the incomplete operation which is the greatest defect of the conventional method by amplitude comparison.

This pulse code modulation circuit is a system wherein pulse codes are modulated by a logic circuit by converting signals into pulse numbers by quantizing them. A stability much higher than in the conventional direct method of amplitude quantization can be thereby obtained and high speed time division coding is made possible by using such very high speed circuit as of the Esaki diode. Thus, wide band signals for television and others can be thereby easily coded.

A regenerating repeater wherein a pulse generator according to the present invention is used will be explained in the following:

FIGURE 12 is a circuit diagram of an embodiment of the pulse regenerating repeater. 41 and 42 are signal wave transmitting cables. $Z_0$ is the characteristic impedance of each cable. 43 is a part corresponding to a pulse generator of the type shown in FIGURE 1. 44 is a coupling transformer. 45 is an output terminal. Now, if the signal wave shown at A in FIGURE 13 is applied to the circuit 43 from the cable 41, it will have its phase reversed as shown in B in FIGURE 13 by the coupling transformer 44, will be applied to the pulse generator 43 and will act as a trigger. The coupling transformer 44 will attenuate the feedback signal simultaneously with reversing the phase and will greatly attenuate the transmission of the feedback signal.

In this circuit, as explained in FIGURE 1, the wave at the point P will be a positive and negative rectangular wave having a width of $2\tau$ as shown at D in FIGURE 13, will have the pulse width and amplitude regenerated and will be transmitted to the cable 42 connected to the point P. This rectangular wave at D in FIGURE 13 has a band width smaller than a unipolar pulse and is preferable for transmission. The time of generating such a regenerated pulse is regulated by superimposing the output of a clock pulse generator 46 of a proper period of a width of $4\tau$ on the direct current source 3. The threshold value of the received pulse is selected by regulating the load line of the negative resistance element 1 with the current source impedance R so that it may be half the received pulse (at D in FIGURE 13).

What is claimed is:

1. A pulse generator providing quantized pulses responsive to a trigger waveform comprising in combination, a nonlinear negative resistance element, a short circuited delay line with a predetermined delay time, a termination resistance connected to said delay line, a current source, and a load resistance coupling said source to said nonlinear element and said termination resistance in series circuit, wherein said load resistance has a value providing a load line operating the nonlinear element at a single normally stable operation point, and means providing a trigger pulse of variable length greater than four times the predetermined delay time to the nonlinear element to generate at least one reflection in said delay line during the presence of the trigger pulse to thereby produce quantized pulses of time periods which are multiples of four times the predetermined delay time.

2. A pulse generator as defined in claim 1 wherein the trigger pulse is a waveform to be sampled, and a counter circuit is coupled to receive said reflections in the delay line to convert the pulse width into a coded count.

3. A pulse generator as defined in claim 1 including means for deriving and utilizing a regenerated pulse taken from the termination resistance of said delay line.

References Cited by the Examiner

UNITED STATES PATENTS

| | | | |
|---|---|---|---|
| 2,798,153 | 7/57 | Dougherty et al. | 328—146 |
| 2,864,000 | 12/58 | Elson | 328—146 |
| 2,975,377 | 3/61 | Price et al. | 307—88.5 |
| 3,065,363 | 11/62 | Ribner | 307—88.5 |
| 3,096,445 | 7/63 | Herzog | 307—88.5 |

OTHER REFERENCES

Esaki Diode Square Wave Generator, IBM Technical Bulletin, vol. 1, No. 6, April 1960.

Tunnel Diode-Transistor Monostable Pulse Generator, RCA Technical Notes, No. 532, March 1962.

JOHN W. HUCKERT, *Primary Examiner.*

DAVID J. GALVIN, *Examiner.*